(12) United States Patent
Bae

(10) Patent No.: US 7,184,806 B2
(45) Date of Patent: Feb. 27, 2007

(54) SLIDING MODULE FOR MOBILE TERMINAL

(75) Inventor: Chul-Ho Bae, Uiwang-si (KR)

(73) Assignee: Samsung Electronics Co., Ltd. (KR)

( * ) Notice: Subject to any disclaimer, the term of this patent is extended or adjusted under 35 U.S.C. 154(b) by 46 days.

(21) Appl. No.: 11/158,373

(22) Filed: Jun. 22, 2005

(65) Prior Publication Data

US 2006/0046783 A1 Mar. 2, 2006

(30) Foreign Application Priority Data

Aug. 27, 2004 (KR) .................. 10-2004-0067758

(51) Int. Cl.
*H04M 1/00* (2006.01)
(52) U.S. Cl. .................. 455/575.4; 379/433.12
(58) Field of Classification Search ............ 455/575.4, 455/575.1, 90.3, 550.1; 379/433.12
See application file for complete search history.

(56) References Cited

U.S. PATENT DOCUMENTS 6,973,186 B2 * 12/2005 Shin .................. 379/433.12
7,003,104 B2 * 2/2006 Lee .................. 379/433.13
7,084,345 B1 * 8/2006 Chen et al. .................. 174/66
2006/0154703 A1 * 7/2006 Kim .................. 455/575.4

* cited by examiner

*Primary Examiner*—Barry Taylor
(74) *Attorney, Agent, or Firm*—The Farrell Law Firm

(57) ABSTRACT

Disclosed is a sliding module for a mobile terminal, which includes a sliding plate having a guide rail with curving points in first and second sections adjacent to each other in a longitudinal direction; a guide plate connected to the sliding plate to support the slidable movement of the sliding plate in a longitudinal direction; a pair of rollers linearly movable on the guide plate to be in rolling contact with the guide rail; and an elastic means for generating an elastic force that makes the rollers move in a direction towards an end of the first or second section. The sliding module connects a pair of housings in such a manner that one can slidably move on the other in both upward and downward directions.

17 Claims, 10 Drawing Sheets

SLIDING MODULE FOR MOBILE TERMINAL

PRIORITY

This application claims priority to an application entitled "Sliding Module for Mobile Terminal" filed with the Korean Intellectual Property Office on Aug. 27, 2004 and assigned Serial No. 2004-67758, the contents of which are incorporated herein by reference.

BACKGROUND OF THE INVENTION

1. Field of the Invention

The present invention relates to a mobile terminal, and more particularly to a sliding module for a mobile terminal which connects a sub-housing to a main housing to enable the sub-housing to be slidable upwardly and downwardly on the main housing in a longitudinal direction of the mobile terminal.

2. Description of the Related Art

Generally, mobile terminals are classified as either a bar type, a flip type, or a folder type terminal according to their shape. A bar-type mobile terminal has a single housing provided with a communication circuit and data input/output means altogether. A flip-type mobile terminal is an improvement of a bar-type terminal having a flip cover. A folder-type mobile terminal has a pair of housings provided with a communication circuit and data input/output means. Currently, the folder type terminal dominates the mobile phone market due to its lighter and smaller design.

Recently, new designs such as a slide type terminal and a swing type terminal have also been introduced to meet the diverse needs and tastes of users. The slide type terminal or the swing type terminal has a pair of facing housings, one of which is slidable or rotatable on the other. Also, mobile terminals capable of composite open/close operations by combining the folder type with the swing type have been introduced.

Among the above designs, slide-type phones are gaining popularity with their efficiency, because they do not require distinct opening and closing movements for use.

A slide-type terminal has a pair of housings, one of which slides on the other facing housing in a longitudinal direction to partially open or close the other housing. Specifically, a keypad with number/character keys or a display window is opened or closed according to the slidable movement.

A user can directly move one housing upward or downward on the other housing within the limits of slidable movement. Alternatively, the user can use a spring or a driving motor to make one housing automatically or semi-automatically slide on the other housing.

U.S. Patent Application No. 379,551 (filed Mar. 6, 2003), commonly assigned to the assignee of the present application, discloses a sliding module for semi-automatically opening or closing a slide-type mobile terminal. The disclosed sliding module uses the elasticity of a spring to open or close the terminal. Within certain limits, the sliding module generates an elastic force that makes one housing slide on the other housing in a direction to cover the keypad provided on the other housing. Beyond the limits, the sliding module generates an elastic force to move one housing in an opposite direction to open the keypad on the other housing.

Although a variety of designs have been developed for mobile terminals, they do not completely satisfy the diverse tastes of users. Recently introduced designs merely provide improvements in open/close operations, without diversifying functions.

SUMMARY OF THE INVENTION

Accordingly, the present invention has been made to solve the problems occurring in the prior art and an object of the present invention is to provide a sliding module useful for mobile terminals that meets the diverse needs and tastes of users.

Another object of the present invention is to provide a sliding module useful for mobile terminals that have diverse open/close operations, diverse sizes of a component mounting space, and diverse functions.

In order to accomplish the above objects of the present invention, there is provided a sliding module for a mobile terminal, which includes a sliding plate having, on one side thereof, a guide rail with curving points in first and second sections adjacent to each other in a longitudinal direction; a guide plate connected to the sliding plate to support the slidable movement of the sliding plate in a longitudinal direction; rollers linearly movable on the guide plate to be in rolling contact with the guide rail; and an elastic means for generating an elastic force that makes the rollers move in a direction towards an end of the first or second section.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In addition, in the following description of the present invention, a detailed description of known functions and configurations incorporated herein will be omitted when it may make the subject matter of the present invention unclear.

Figure 1:
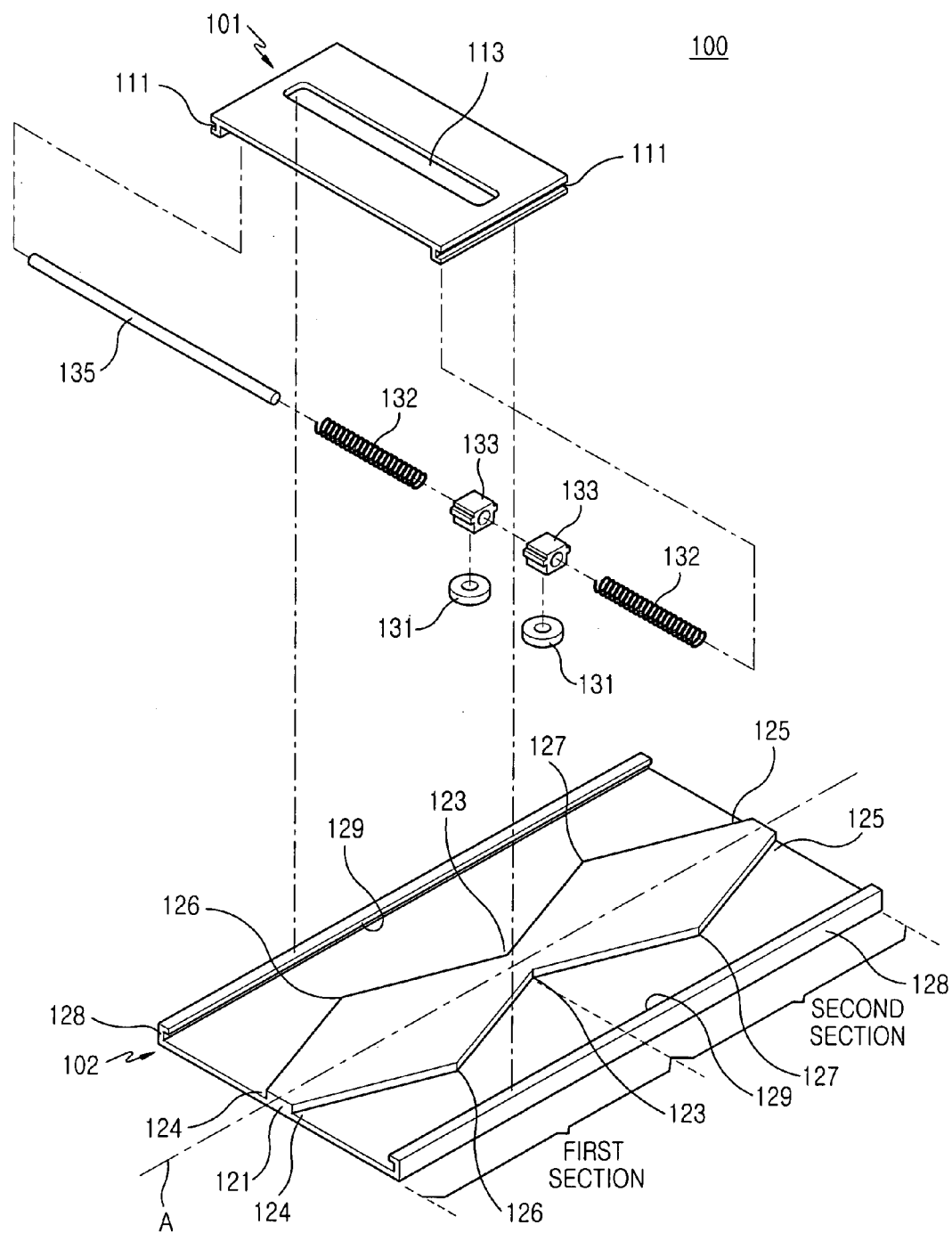
FIG. 1 is an exploded perspective view of a sliding module for a mobile terminal according to the present invention.
Figure 2:
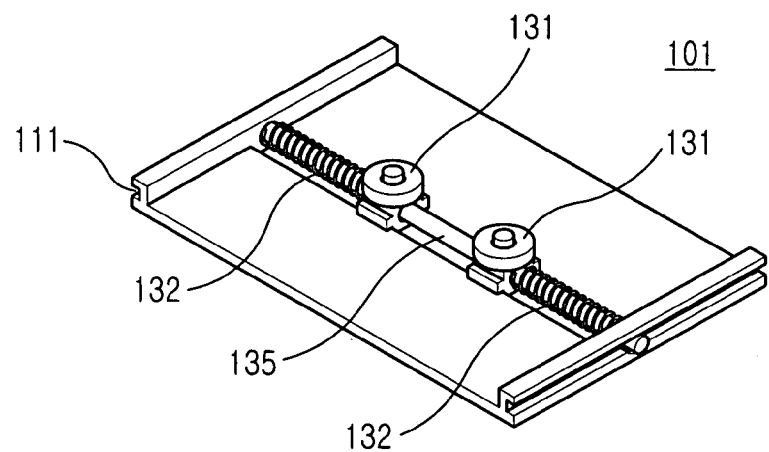
FIG. 2 is a perspective view of a guide plate of the sliding module in FIG. 1.
Figure 3:
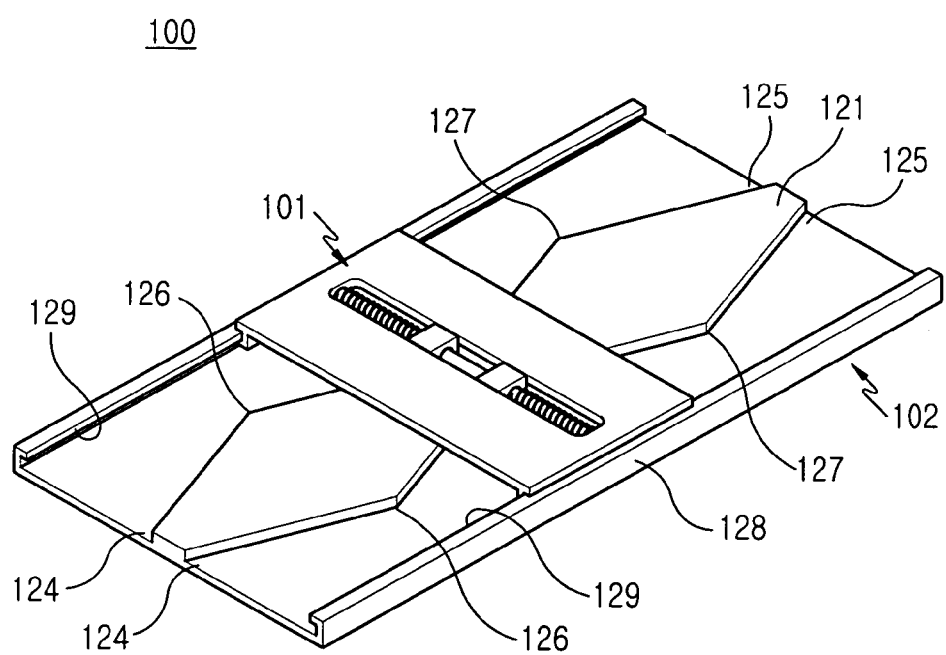
FIG. 3 is an assembled perspective view of the sliding module in FIG. 1.

As shown in FIGS. 1 to 3, a sliding module 100 for a mobile terminal according to the present invention includes a guide plate 101, a sliding plate 102, and a pair of rollers 131. The guide plate 101 has sliding grooves 111 formed in a longitudinal direction at both lateral edges thereof and a guide hole 113 formed in a direction perpendicular to the sliding grooves 111. The sliding plate 102 is relatively longer than the guide plate 101. It has a guide rail 121 protrudingly formed on one side thereof and sliding guides 128 formed at both lateral edges thereof in a bent shape.

The guide rail 121 is divided into first and second sections that are positioned respectively on lower and upper halves of the sliding plate 102 in the longitudinal direction. The first and second sections have first and second curving points 126 and 127 at centers thereof. The two sections can be formed symmetrically with respect to an axis A that is parallel to the longitudinal direction of the sliding plate 102. The guide rail 121 has first points 123 at which the first section contacts the second section, second points 124 corresponding to a lower end of the first section and third points 125 corresponding to an upper end of the second section. The first curving points 126 are positioned between the first points 123 and the second points 124, while the second curving points 127 are positioned between the first points 123 and the third points 125. Since the guide rail 121 is symmetric with respect to the axis A, the first, second and third points 123, 124 and 125 are also formed symmetric with respect to the axis A. The curving points 126 and 127 are also formed symmetric with respect to the axis A. The distance between each pair of the first, second and third points 123, 124 and 125 is preferably shorter than the distance between each pair of the curving points 126 and 127.

The sliding guides 128 are formed in a bent shape at both lateral edges of the sliding plate 102 to face each other. The sliding guides 128 have sliding ribs 129 protruding inwardly from the inner sides thereof. The sliding ribs 129 are movably engaged into the sliding grooves 111 of the guide plate 101. Due to this engagement, the sliding plate 102 can slidably move on the guide plate 101.

Although the embodiment explained above forms the sliding grooves 111 on the guide plate 101 and the sliding ribs 129 on the sliding plate 102, it is obvious to those skilled in the art that the sliding grooves 111 and the sliding ribs 129 can be formed on the sliding plate 102 and the guide plate 101, respectively.

The pair of rollers 131 are mounted on the guide plate 101 to be linearly movable in a direction perpendicular to the length of the sliding plate 102. When the guide plate 101 and the sliding plate 102 are assembled together, the two rollers 131 contact the side walls of the guide rail 121. Under the elastic forces of coil springs 132, the rollers 131 are maintained in close contact with the side walls of the guide rail 121. In other words, the coil springs 132 generate elastic forces acting on the two rollers 131 forcing them towards each other.

The rollers 131 are rotatably connected to sliders 133 that are partially inserted into the guide hole 113 to be linearly movable along the guide hole 113. Due to the connection with the linearly movable sliders 133, the rollers 131 are also linearly movable on the guide plate 101. The coil springs 132 can be a pair of compression springs, each having one end fixed to one lateral edge of the guide plate 101 and the other end fixed to the slider 133. The coil springs 132 generate elastic forces acting in a direction towards each other.

In order to stabilize the movement of the coil springs 132 and the sliders 133, a guide shaft 135 is provided within the guide hole 113, as best seen in FIG. 2. The guide shaft 135 is inserted into the coil springs 132 and penetrates the sliders 133 so that its two ends are fixed to the lateral ends of the guide plate 101.

Although compression springs have been explained as means for generating elastic forces acting in a direction so that the rollers 131 are forced towards each other, it is obvious that a tension spring can also be used as the elastic means. In other words, when both ends of a tension spring are connected to the two sliders 133, respectively, the rollers 131 will be under an elastic force acting in a direction so that they are forced towards each other.

With the slidable movement of the sliding plate 102 in a longitudinal direction, the rollers 131 linearly move in a perpendicular direction. Since the rollers 131 have a tendency to be forced towards each other due to the elastic forces generated from the coil springs 132, the sliding plate 102 receives a driving force that moves it toward the first, second, or third points 123, 124, or 125. The operation of the sliding module 100 having the above structure is illustrated in FIGS. 3 to 7.

Figure 4:
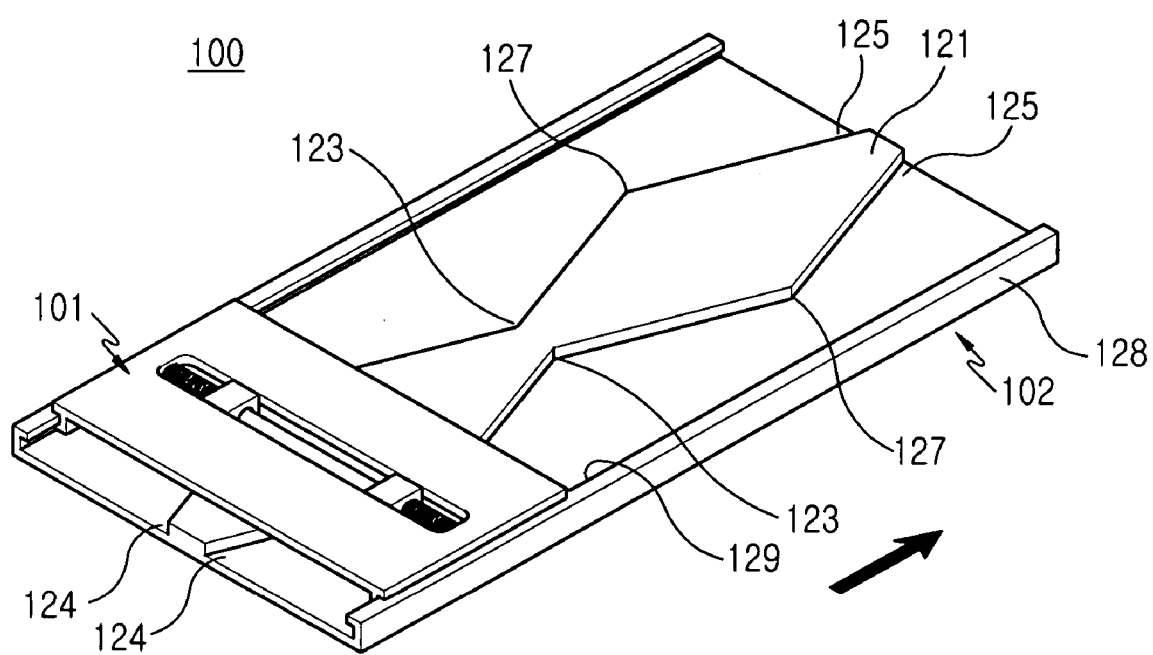
FIGS. 4 and 5 are perspective views showing the movement of a sliding plate of the sliding module in FIG. 1 in a first direction.
Figure 5:
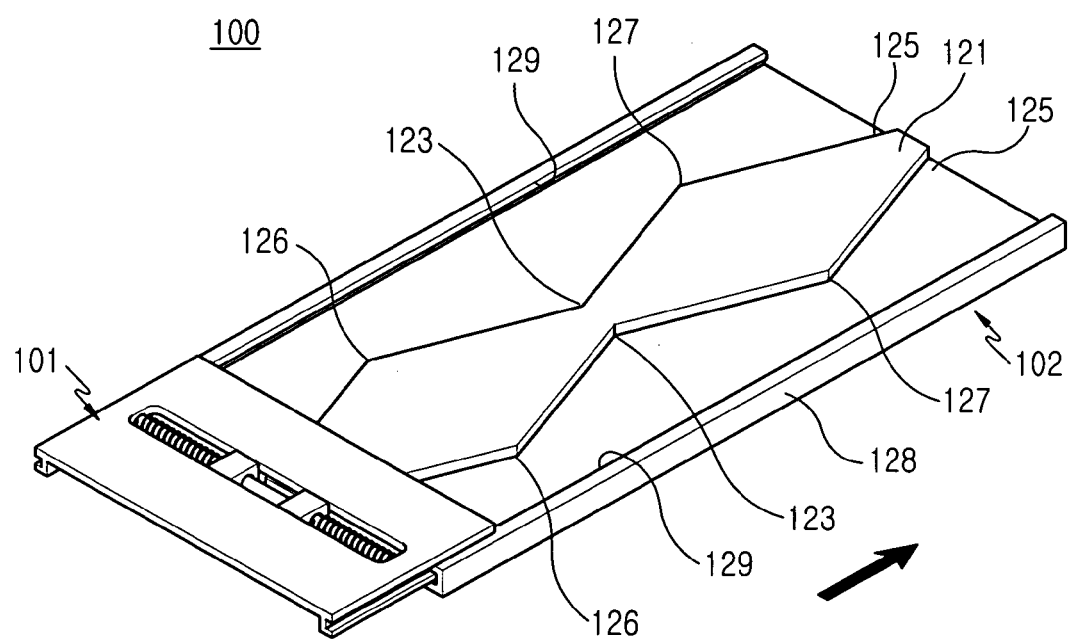

Referring to FIGS. 3 to 5, if the sliding plate 102 moves in a first direction from a position where the rollers 131 are located at the first points 123, the rollers 131 will move to the first section of the sliding plate 102.

When the rollers 131 are located between the first points 123 and the first curving points 126, the sliding plate 102 receives a driving force that moves it in a second direction due to the elastic forces acting on the rollers 131. Since the driving force generated between the first points 123 and the first curving points 126 makes the sliding plate 102 move downward in the second direction, the rollers 131 will be located at the first points 123 again.

When the rollers 131 are located between the first curving points 126 and the second points 124, the sliding plate 102 receives a driving force that moves it upward in the first direction due to the elastic forces acting on the rollers 131. Since the driving force generated between the first curving points 126 and the second points 124 makes the sliding plate 102 move upward, the rollers 131 will be located at the second points 124. In other words, the sliding module 100 generates a driving force making the sliding plate 102 move upward or downward in the first and second directions, respectively, according to the location of the rollers 131 within the first section.

Similarly, when the rollers are located within the second section, the sliding module 100 generates a driving force that makes the sliding plate 102 move upward or downward. The driving force acts on the sliding plate 102 to move it in the first direction when the rollers 131 are located between the first points 123 and the second curving points 127, or move it in the second direction when the rollers 131 are located between the second curving points 127 and the third points 125. The sliding module 100 generates the driving force in the second section using the same principle as in the first section.

FIGS. 8 to 11 are views showing a mobile terminal 400 having the sliding module 100 explained above. Hereinafter, the construction and operation of the mobile terminal 400 will be explained in detail with reference to FIGS. 8 to 11.

The mobile terminal 400 includes a main housing 401 and a sub-housing 402 that are connected to face each other when closed. The sub-housing 402 is slidably movable on the main housing 401 in a longitudinal direction. The guide plate 101 of the sliding module 100 is mounted on the front surface of the main housing 401. Also, the sliding plate 102 is mounted on the rear surface of the sub-housing 402 that faces the front surface of the main housing 401. Accordingly, the sub-housing 402 can slidably move on the main housing 401.

The main housing 401 has a first keypad 411 provided with number/character keys and a transmitter 413 at a lower part 401a of the front surface thereof. The lower part 401a of the main housing 401 is exposed when the sub-housing 402 is moved upward. A camera lens assembly 405 may be provided at an upper part 401b of the front surface of the main housing 401. The camera lens assembly 405 is exposed when the sub-housing is moved downward. The guide plate 101 is mounted on the main housing 401 at a position where it is never exposed by the upward or downward movement of the sub-housing 402. The camera lens assembly 405 has a built-in camera (not shown), an exposure window 451 and a flash 453.

The sub-housing 402 has, on the front surface thereof, a display device 415, a receiver 417 provided above the display device 415 and a second keypad 419 with menu keys and select keys provided below the display device 415. The sliding plate 102 is mounted on the rear surface of the sub-housing 402 and is slidably connected to the guide plate 101.

Figure 8:
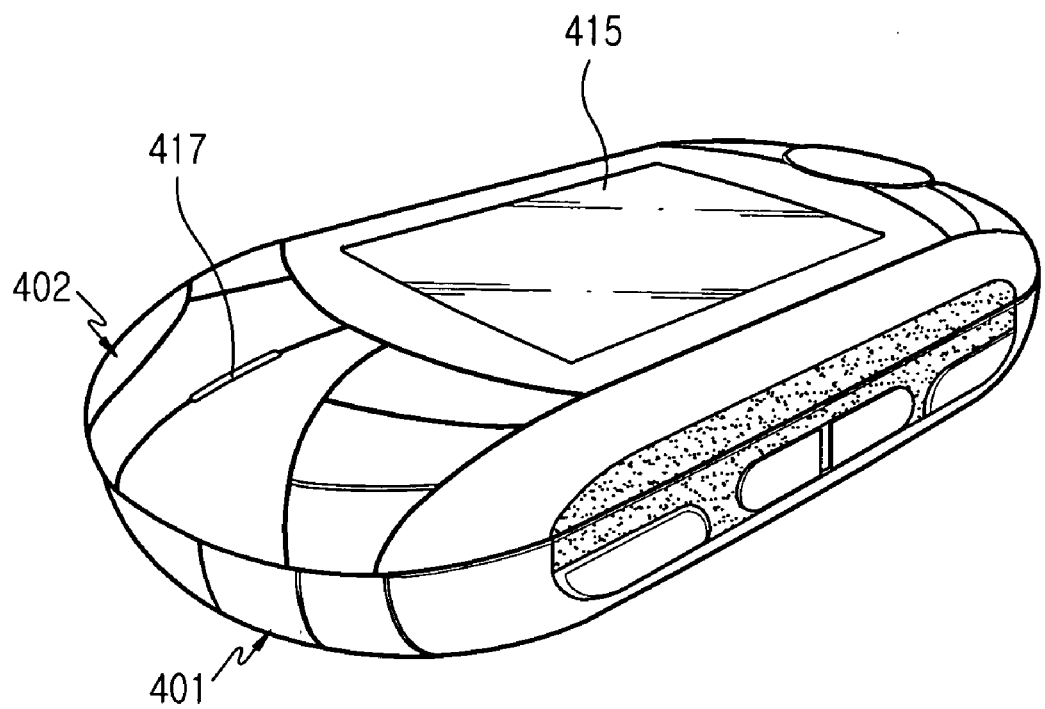
FIG. 8 is a perspective view of a mobile terminal having the sliding module in FIG. 1.

Referring to FIGS. 3 and 8, when the sub-housing 402 completely closes the main housing 401, the rollers 131 provided on the guide plate 101 are located at the first points 123 of the sliding plate 102. At this time, the rollers 131 are maintained in close contact with the side walls of the guide rail 121 due to the elastic forces of the coil springs 132. When located between the first curving points 126 and the second curving points 127, the rollers 131 receive elastic forces making them move to the first points 123. Accordingly, the sub-housing 402 can be stably maintained in the state that it covers the main housing 401.

Figure 9:
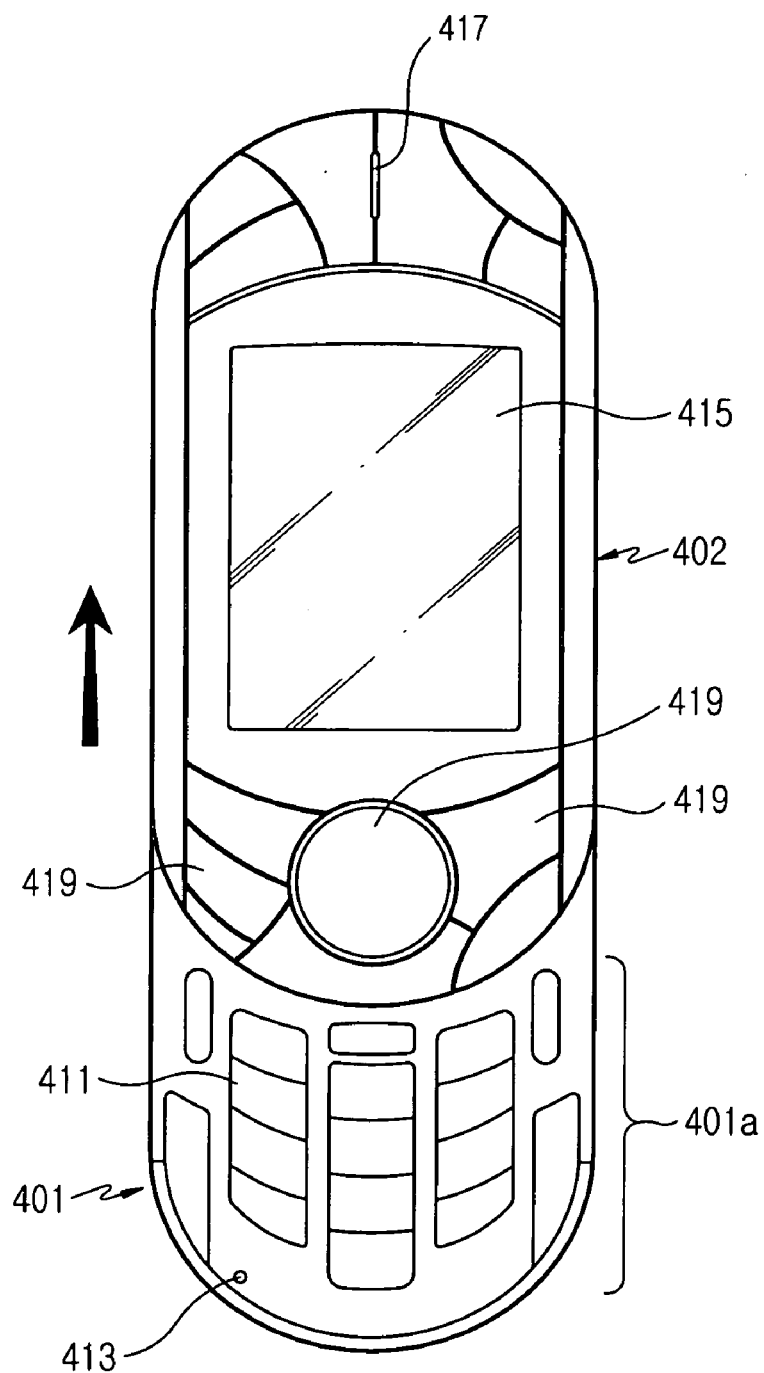
FIG. 9 is a top view of the mobile terminal in FIG. 8 with a sub-housing moved upward in the first direction on a main housing.
Figure 10:
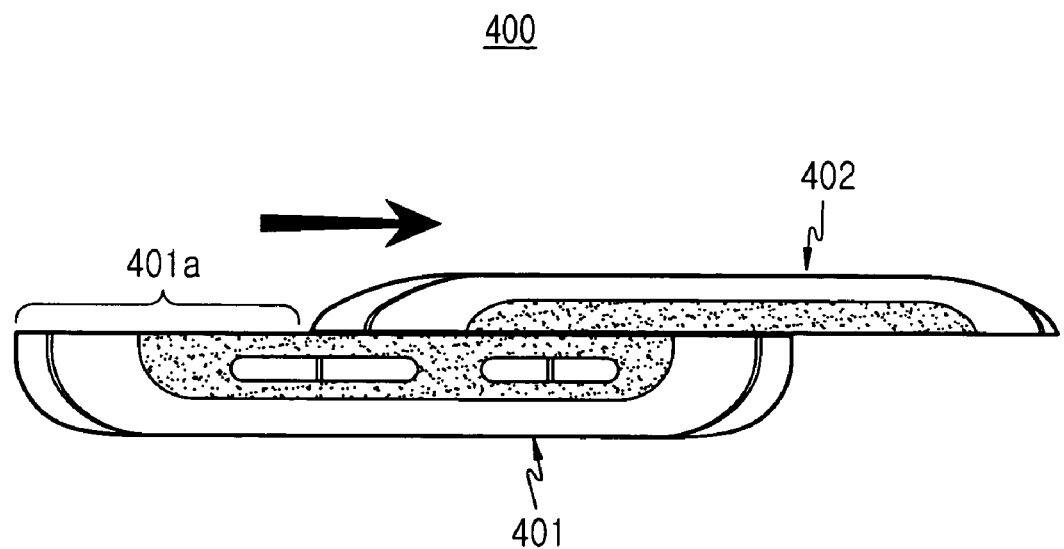
FIG. 10 is a side view of the mobile terminal in FIG. 9.

When the user moves up the sub-housing 402 as shown in FIGS. 9 and 10, the first keypad 411 and transmitter 413 provided on the main housing 401 are exposed. At this time, the sliding plate 102 slides up on the guide plate 101, thereby locating the rollers 131 at the second points 124 as shown in FIG. 5. During the upward movement of the sub-housing 402 on the main housing 401, the rollers 131 slidably move within the first section of the sliding plate 102.

When the rollers 131 are located between the first points 123 and the first curving points 126, the sliding module 100 generates a driving force that moves the rollers 131 back to the first points 123. The movement of the rollers 131 toward the first points 123 also generates a driving force that moves the sub-housing 402 down to completely overlap or cover the main housing 401.

When the rollers 131 are located between the first curving points 126 and the second points 124, the sliding module 100 generates a driving force that moves the rollers 131 to the second points 124. At this time, the sub-housing 402 receives a driving force acting in an upward direction so that it can further slide up to expose the first keypad 411 and transmitter 413 provided on the main housing 401.

In other words, if the user moves the sub-housing 402 up only to the extent that the rollers 131 pass the first points 123 and the first curving points 126, the first keypad 411 and the transmitter 413 can be exposed by the driving force generated by the sliding module 100.

Figure 6:
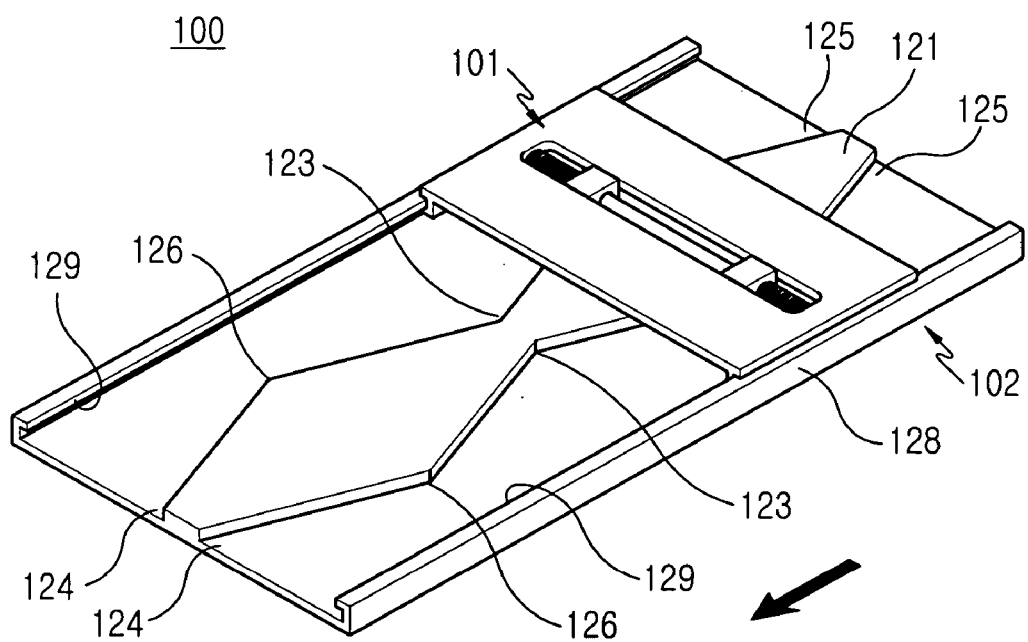
FIGS. 6 and 7 are perspective views showing the movement of a sliding plate of the sliding module in FIG. 1 in a second direction.
Figure 7:
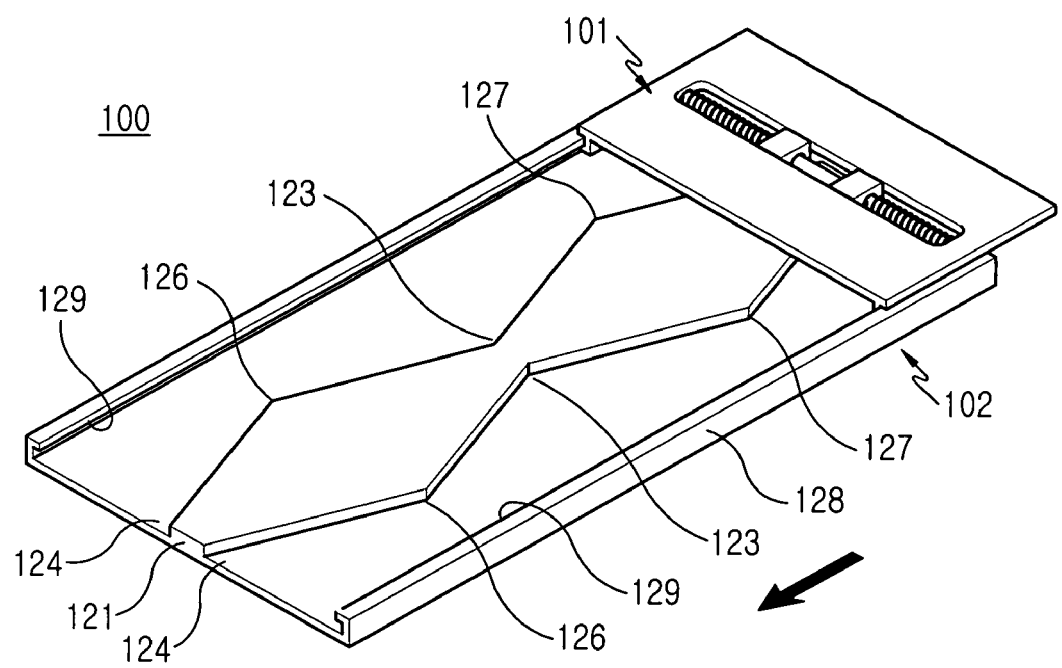
Figure 11:
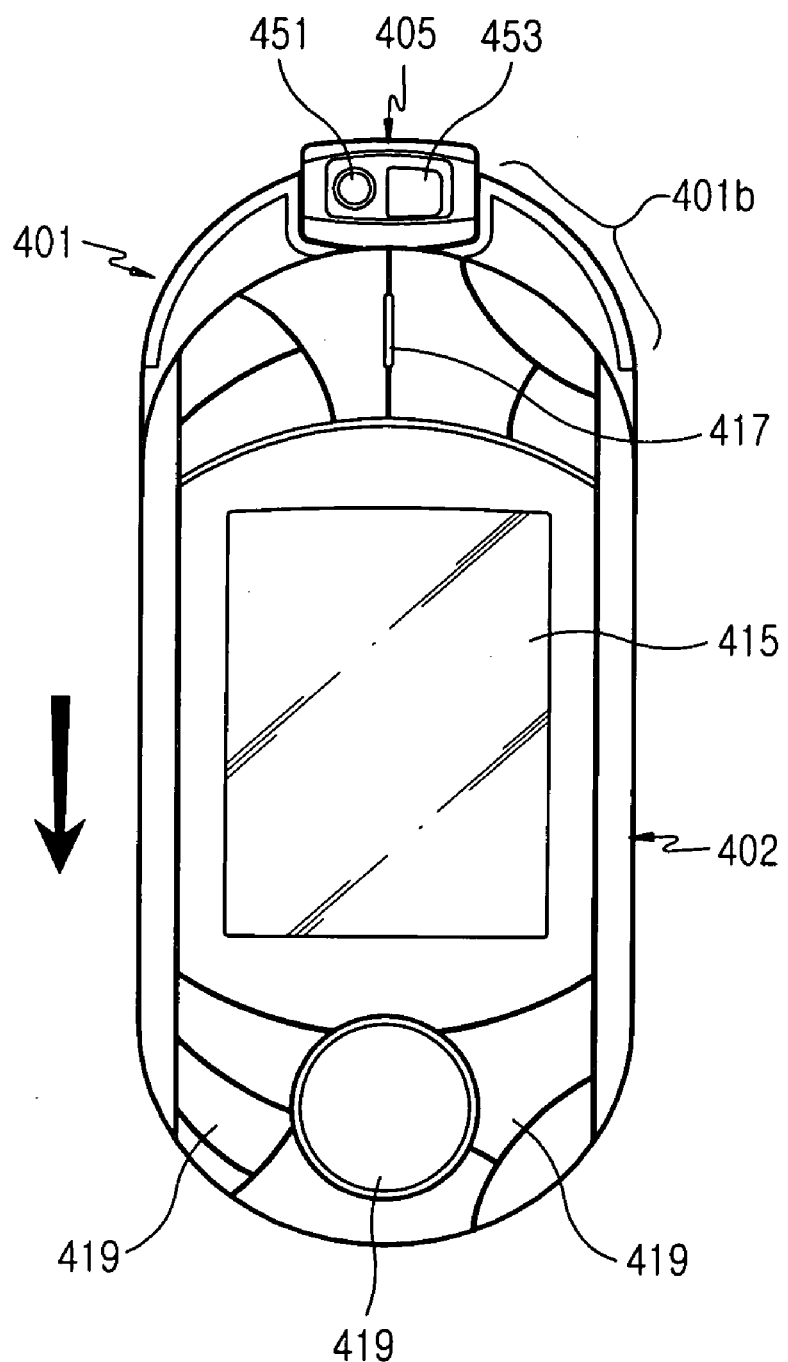
FIG. 11 is a top view of the mobile terminal in FIG. 10 with the sub-housing moved downward in the second direction on the main housing.

FIG. 11 shows a slide-type mobile terminal with the sub-housing 402 moved downward on the main housing 401. Referring to FIGS. 6 and 7, when the user moves down the sub-housing 402 to expose the upper part 401a of the main housing 401, the rollers 131 slidably move within the second section of the sliding plate 102.

With the downward movement of the sub-housing 402, the rollers 131 are located between the first points 123 and the second curving points 127 or between the second curving points 127 and the third points 125. The rollers 131 move to get closer to each other due to the elastic forces generated by the coil springs 132. Accordingly, when the rollers 131 are located between the first points 123 and the second curving points 127, the sliding module 100 generates a driving force moving the sub-housing 402 upward again. Due to the driving force, the sub-housing 402 returns to its original position that covers the main housing 401. When the rollers 131 are located between the second curving points 127 and the third points 125, the sliding module 100 generates a driving force that further moves the sub-housing 402 down.

If the user moves the sub-housing 402 down only to the extent that the rollers 131 pass the first points 123 and the second curving points 127, the camera lens assembly 405 provided at the upper part of the main housing 401 will be completely exposed by the driving force generated by the sliding module 100.

In other words, the user needs to move the sub-housing 402 in either direction only to the extent that the rollers 131 pass the first curving points 126 or the second curving points 127 in order to expose the first keypad 411 or the camera lens assembly 405 using a driving force generated by the sliding module 100. Consequently, the mobile terminal 100 can semi-automatically move the sub-housing 402 in an upward or downward direction on the main housing 401 using the sliding module 100.

The distances of the upward and downward movements of the sub-housing 402 may vary depending on the lengths of the first and second sections. For example, in the mobile terminal 400, the distance of the upward movement of the sub-housing 402 will be relatively longer than that of the downward movement when the first section is set to be longer than the second section.

It is obvious that the distances of the upward and downward movements of the sub-housing 402 can be adjusted according to the disposition of the input and output devices (such as the first and second keypads 411 and 419, display device 415 and camera lens assembly 405). For example, a mobile terminal may have a display device on the main housing and first and second keypads on the sub-housing. If the display device provided on the main housing is exposed by the downward movement of the sub-housing, the second section should be longer than the first section.

Also, the extent that the user has to manually move the sub-housing 402 up or down in order to open or close the main housing 401 is determined according to the distance between the first points 123 and the first or second curving points 126 or 127. If the distance between the first points 123 and the first curving points 126 is set to be shorter than that between the first curving points 126 and the second points 124, the distance of the user's upward movement of the sub-housing 402 will be shortened. To the contrary, if the distance between the first points 123 and the first curving points 126 is set to be longer than that between the first curving points 126 and the second points 124, the distance of the user's upward movement of the sub-housing 402 will become longer.

As explained above, the distance of the upward or downward slidable movement of the sub-housing 402 and the distance to be moved up or down by the user can be adjusted by changing the angles of the guide rail 121.

The sliding module for a mobile terminal according to the present invention connects a pair of housings in such a manner that one can slidably move on the other in both upward and downward directions. Since various dispositions of input and output means are possible according to the directions and distances of the slidable movement of a sub-housing, designs and functions of mobile terminals can be further diversified to meet the needs and tastes of users. Also, the sliding module enables the sub-housing to semi-automatically slide up or down on the main housing as well as maintaining stability of the housings in both of the open positions as well as the closed position, thereby enhancing user convenience.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A sliding module for a mobile terminal, which comprises:
    a sliding plate having, a guide rail with curving points in first and second sections adjacent to each other in a longitudinal direction;
    a guide plate connected to the sliding plate to support the slidable movement of the sliding plate in the longitudinal direction;
    a pair of rollers linearly movable on the guide plate to be in rolling contact with the guide rail; and
    an elastic means for forcing the rollers to move in a direction towards an end of the first and second section.

2. The sliding module as claimed in claim 1, wherein said guide rail protrudes from one side of the sliding plate in a shape symmetric with respect to an axis that is parallel to the longitudinal direction of the sliding plate and has two symmetrical pairs of curving points, a distance between each pair of curving points being longer than a distance between a pair of end points of each of the first and second sections.

3. The sliding module as claimed in claim 2, wherein said rollers are located at positions contacting both side walls of the guide rail and receive elastic forces making them move closer to each other.

4. The sliding module as claimed in claim 3, wherein said elastic means are a pair of compression springs, each having one end fixed to one lateral edge of the guide plate and the other end fixed to one of the rollers, and the compression springs force the rollers towards each other.

5. The sliding module as claimed in claim 3, wherein said elastic means is a tension spring having both ends connected to the two rollers, respectively, and generating an elastic force acting in a direction towards each other.

6. The sliding module as claimed in claim 1, wherein said guide rail has first points at which the first section contacts the second section, second points corresponding to a lower end of the first section, third points corresponding to an upper end of the second section, and curving points between the first points and the second points and between the first points and the third points.

7. The sliding module as claimed in claim 6, wherein said rollers linearly move on the guide plate under elastic forces to be stably located at the first points or the second points within the first section, and at the first points or the third points within the second section.

8. The sliding module as claimed in claim 6, wherein the longitudinal distance between the first points and curving points within the first section is equal to the longitudinal distance between the curving points within the first section and the second points.

9. The sliding module as claimed in claim 6, wherein the longitudinal distance between the first points and curving points within the first section is not equal to the longitudinal distance between the curving points within the first section and the second points.

10. The sliding module as claimed in claim 6, wherein the longitudinal distance between the first points and curving points within the second section is equal to the longitudinal distance between the curving points within the second section and the third points.

11. The sliding module as claimed in claim 6, wherein the longitudinal distance between the first points and curving points within the second section is not equal to the longitudinal distance between the curving points within the second section and the third points.

12. The sliding module as claimed in claim 1, wherein said guide plate further includes a guide hole formed in a direction perpendicular to the longitudinal direction of the sliding plate to accommodate the linear movement of the rollers.

13. The sliding module as claimed in claim 12, wherein said guide plate further includes a pair of sliders which are linearly movable along the guide hole and to which the rollers are rotatably connected.

14. The sliding module as claimed in claim 12, wherein said guide plate further includes a guide shaft provided adjacent to the guide hole to stabilize the linearly slidable movement of the rollers.

15. The sliding module as claimed in claim 14, wherein said elastic means are coil springs through which the guide shaft passes.

16. The sliding module as claimed in claim 1, further comprising sliding guides longitudinally formed at both lateral edges of the sliding plate and bent to face each other enclosing both lateral edges of the guide plate.

17. The sliding module as claimed in claim 16, further comprising:
    sliding grooves formed at both lateral edges of the guide plate; and
    sliding ribs protruding inwardly from the inner sides of the sliding guides and movably engaged with the sliding grooves.

* * * * *